(12) United States Patent
    Bader (10) Patent No.: US 9,779,410 B2
(45) Date of Patent: Oct. 3, 2017

(54) NETWORK-IMPLEMENTED METHODS AND SYSTEMS FOR PROVIDING DYNAMIC PRODUCT PRICING

(71) Applicant: Emil Bader, Jerusalem (IL)

(72) Inventor: Emil Bader, Jerusalem (IL)

( * ) Notice: Subject to any disclaimer, the term of this patent is extended or adjusted under 35 U.S.C. 154(b) by 1000 days.

(21) Appl. No.: 14/022,187

(22) Filed: Sep. 9, 2013

(65) Prior Publication Data

US 2015/0073872 A1    Mar. 12, 2015

(51) Int. Cl.
    *G06Q 30/02*    (2012.01)
(52) U.S. Cl.
    CPC ................ *G06Q 30/0206* (2013.01)

(58) Field of Classification Search
    CPC .................................. G06Q 30/0206
    See application file for complete search history.

(56) References Cited

U.S. PATENT DOCUMENTS 8,374,907 B1 *   2/2013  Choi ............. G06Q 30/02
                                           705/1.1

* cited by examiner

*Primary Examiner* — Sonji Johnson
(74) *Attorney, Agent, or Firm* — Guy Levi; The IP Law Firm of Guy Levi, LLC (57) ABSTRACT

The disclosure relates to network-implemented methods and systems for providing dynamic product pricing to a seller, using a self-updating database.

17 Claims, 3 Drawing Sheets

NETWORK-IMPLEMENTED METHODS AND SYSTEMS FOR PROVIDING DYNAMIC PRODUCT PRICING

FIELD OF THE INVENTION

The disclosure is directed to network-implemented methods and systems for providing dynamic product pricing to a seller or a buyer, using a self-updating database.

BACKGROUND

To date, selling a used vehicle is simple. For example blue books can be produced periodically for vehicles with a perceived market value of every car calculated as a function of for example, age, repairs and other variables. The way these prices are produced is typically simple: a large numbers of appraisers or valuation experts work around the clock; talking to businesses that sell these vehicles, thereby obtaining what they believe is a reasonable price to sell a specific car, with certain variables, within a given time frame. These prices are collected, processed internally and then published. Furthermore, these blue books are often considered a good source, which a buyer and seller can use as the basis to start negotiating.

Although an accepted practice with regard to vehicles, translation to other items is problematic. Whether the products are smartphones, photocopiers, laptops, etc. Often, a seller of such items will look at the prices of equivalent products on second-hand sales websites such as eBay, Amazon and the like. Such websites generally have a large range of prices for used goods with varying valuation methods, increasing uncertainty.

Accordingly, there is a need is for a reliable single source that offers a market value price for a variety of products with specific variables that are tailored for each product. Moreover, there is a need for that single source to be continuously updated.

SUMMARY

In an embodiment, provided is a network-implemented method for automated dynamic pricing of a product for a seller, implementable in a system comprising: a self-updating database, a database manager module, a crawler module, an analyzer module, a calculator; and an end user interface, the method comprising the steps of: periodically initiating a query by the analyzer to the crawler; using the crawler, retrieving the price of the product from a plurality of pre-determined web sites provided by the analyzer over a global communication network; using the analyzer module, determining a plurality of predetermined factors configured to predict the price of the product; storing a plurality of the predetermined factors' coefficients on a non-transient, computer readable medium for predicting the price obtained in a memory of the self-updating database, the self-updating database being in communication with the analyzer and the calculator; and upon receiving an inquiry from the seller, pricing the product using the calculator using the stored predetermined factors' coefficients.

In another embodiment, provided herein is a non-transitory, computer-readable medium having instructions stored thereon for automated dynamic pricing of a product for a seller, implementable on a system comprising: a self-updating database, a database manager module, a crawler module, an analyzer module, a calculator; and an end user interface, wherein the instructions, when executed, cause a network enabled computing apparatus to: periodically initiate a query by the analyzer to the crawler; instruct the crawler to retrieve the price of the product from a plurality of pre-determined web sites provided by the analyzer over a global communication network; instruct the analyzer to determine predetermined factors' coefficients configured to predict the obtained price of the product; store a plurality of predetermined coefficients on a non-transient computer-readable medium for determining the price determined by the analyzer; and upon receiving an inquiry from the end-user, using the stored coefficients price the product with the calculator.

In yet another embodiment, provided herein is a system for providing automated dynamic pricing of a product, comprising: a self-updating database; a database manager module; a crawler module; an analyzer module; a calculator; and an end user interface.

BRIEF DESCRIPTION OF THE DRAWINGS

The features of the network-implemented methods and systems for providing dynamic product pricing to a seller using a self-updating database described will become apparent from the following detailed description when read in conjunction with the drawings, which are exemplary, not limiting, and in which.

While the disclosure is amenable to various modifications and alternative forms, specifics thereof have been shown by way of example in the drawings and will be further described in detail hereinbelow. It should be understood, however, that the intention is not to limit the disclosure to the particular embodiments described. On the contrary, the intention is to cover all modifications, equivalents, and alternatives.

DETAILED DESCRIPTION OF THE INVENTION

The disclosure relates in one embodiment to network-implemented methods and systems for providing a seller with dynamic product pricing using a self-updating database.

The network-implemented methods and systems for providing dynamic product pricing to a seller using a self-updating database described, can provide a free and fully interactive online "blue book" in which a customer, for example a seller, can choose a product, provide information on how old it is, its state, and any other variables that are relevant to that product, and receive a true market value for their specific product in their country or, under certain circumstances, region, county, or town. Moreover, the network-implemented methods and systems for providing dynamic product pricing to a seller using a self-updating database described can potentially be used to offer other services such as, for example, prospective and retrospective data in graphs.

In an embodiment, the network-implemented methods and systems for providing dynamic product pricing to a seller using a self-updating database described can be divided to a number of discrete steps; manual data entry, which can be done at any time concurrently with the automated process of the next steps using a database management module; data collection from a wide variety of new and used price websites, forums and review sites; data processing to produce equations ranging in their sophistication that can model the prices of products as a function of a number of predetermined variables; on demand calculating product prices using the produced formulas and equations, (in other words, effectively creating a unified "blue book"). The technical implementation of the network-implemented methods and systems for providing dynamic product pricing to a seller using a self-updating database described can be configured to allow parallel functionality among all steps, thus enhancing its ability to operate efficiently.

The network-enabled systems for providing dynamic product pricing to a seller using a self-updating database described can be comprised of a number of independent subsystems, or modules, each capable of operating on a separate or the same computer (or servers) and can be configured to handle downtime of other subsystems or modules, thus providing an advantage over a single system as it allows to constantly upgrade individual parts of the system without any real downtime.

In an embodiment, the term "module" refers to any currently known or later developed hardware, software, firmware, artificial intelligence, fuzzy logic, or combination of hardware and software that is capable of performing the functionality associated with that element. In another embodiment, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Accordingly and in an embodiment, provided herein is a network-implemented method for automated dynamic pricing of a product for a seller, implementable in a system comprising: a self-updating database, a database manager module, a crawler module, an analyzer module, a calculator; and an end user interface, the method comprising the steps of: periodically initiating a query by the analyzer to the crawler; using the crawler, retrieving the price of the product from a plurality of pre-determined web sites provided by the analyzer over a global communication network; using the analyzer module, determining the price of the product; storing a plurality of predetermined coefficients for predicting the price obtained in a memory of the self-updating database, the self-updating database being in communication with the analyzer and the calculator; and upon receiving an inquiry from the seller, pricing the product using the calculator.

The system can also comprise: a plurality of heterogeneous hardware and software components (e.g., wired/wireless communications hardware/software) configured to implement the methods described herein thus providing one or more services. An additional Web Exchange module can comprise, for example, a service provider configured to provide access to the one or more services provided by the Web Exchange module via a network to one or more service requesters configured to access the one or more services via the service provider over the network. The Web Exchange system can be configured and implemented according to a vendor-independent Web Service architecture generated according to a structured design process for designing and generating vendor-independent Web Service architectures such that, for example, the plurality of heterogeneous hardware components are organized according to two or more tiers and two or more layers of the Web Exchange architecture, and/or one or more Web Exchanges design patterns are applied to the Web Exchange architecture, such that each design pattern models a particular structure that is applicable to the Web Exchange. For example, one Web Exchange design pattern/architecture may be associated with providing dynamic pricing to a seller, while a second Web Exchange design pattern/architecture may be associated with providing prospective dynamic price projections.

An operational Turing type apparatus (e.g., a Turing machine) can be provided to the client (or seller) and be configured and/or adapted to connect to the network. That apparatus, which can be, for example, a mobile phone, a smart phone, a touch phone, a personal digital assistant (PDA) phone, or an ultra-mobile personal computer (UMPC) or a Personal computer (PC) a Smart TV a cable Box or another Turing type apparatus configured to run the dedicated software, may be configured to provide the necessary pricing parameters used in the equations.

The components in system for providing a network-implemented method for automated dynamic pricing of a product for a seller can comprise a self-updating database (referring to any collection of information such as a database file, a lookup table, or the like and combination thereof), which in an embodiment can hold relevant information, such as, for example; product names, product specifications, links, formulas and coefficients. In other words, the database holds the parameters used to describe the price related behavior of the product sought to be sold. For example, for a vehicle, the parameters can be make, model year, mileage, running condition, color etc. Likewise, the database will also hold the weighting (i.e., coefficient) for each of the variables (parameters). In another example, for the sale of a smartphone, the parameters (variables) can be make, model, condition, whether the SIM is removable, whether the smartphone is configured for CDMA (Code division multiple access) or GSM (Global System for Mobile communications), 3G, 4G, LTE, etc. Each variable will affect the final pricing and will be weighted with the proper coefficient. Other items, for example; laptops, televisions, homes, and the like will all have specific valuation variables and weighting which can be specific for example, a geographic area, state, county, etc. All these variables and their weighting coefficients can be stored on a memory module of the self-updating database and entered and maintained initially by the database manager module.

The information can be organized, for example, in three kinds of tables. One table for example, could be tables required initial one-time data entry, followed by occasional (although infrequent) manual updating. Access to these tables can only be given to administrators of the database. Examples of additions that may require an update entry in one of these tables can be, for example; data required for expanding the service to another geographic area (e.g., Country table); Adding a manufacturer offering a product (e.g., Maker table); and/or a new generic function (in other word pricing equation) to fit formulas (e.g., "DetailFunction" table).

Another type of table can be, for example, Continuously Monitored Entry tables. These tables, unlike the first group, could continuously be appended and changed and can be filled by anyone authorized by the system to do so, while authorization is specific, and can prohibit access to other tables or functions. Moreover, any new entries can require validation from an administrator before their changes take effect. Third type of tables could be tables automatically updated by the analyzer module and can include the factors' coefficients used for predicting the price. These coefficients are almost constantly changing each and every time the analyzer updates coefficients, those are incorporated into the table. The table could, for example, be used to provide both historical trend (retrospective pricing) and future (prospective) trend of a particular price.

The systems described herein for providing a network-implemented method for automated dynamic pricing of a product for a seller, can further comprises a database management module, allowing access, data review and data entry to the Database. It will allow inputting data, as well as to review the data and approve it, before officially entering active status. Access to the database could be controlled through this module to ensure a uniform method of managing the database. Permissions will be implemented in the Database Management Module to deny access of One Time Entry and Analyzer Automated Update tables to those unauthorized to update any table other than the Continuously Monitored Entry tables. The database management module can be operably coupled to the self-updating database and be in communication with the database. The term "in communication with" refers in an embodiment, to any coupling, connection, or interaction using electrical signals to exchange information or data, using any system, hardware, software, protocol, or format.

The systems described herein for providing a network-implemented method for automated dynamic pricing of a product for a seller, can further comprises a crawler, operably coupled and in two-way communication with the analyzer module. The term "crawler" refers to any software that performs searches of content over a network and can include "bots", "robots", "automated site searchers" and the like and in another embodiment, encompasses a search engine, going through the WWW to obtain data to obtain, retrieve and build indices. Likewise, the crawler used herein can be programmable to perform particular actions sequences for generating queries to a web site. The function of the crawler in the methods and systems described herein can be to retrieve relevant data from websites provided by the analyzer through the database management module. This data can be for example; new prices, used prices matched with product age and state, etc. In an embodiment, the crawler does not function on its own but is prompted by another subsystem (e.g., the Analyzer) that requires the data. When asked to retrieve data, the crawler can receive the relevant WWW links to the specific product from the Database, retrieves data from those links, and returns that data to the Analyzer module.

The data gathered from each website can then be collected and structured in a defined manner: For example, for each of the requested product model, a collection of lists can be created. The crawler can then access every link that belongs to that product model. In circumstances where a webpage may contain a collection of links to individual products, the crawler can be configured to iterate over all those links. In addition, for each individual product of that model, a new list can be created. Accordingly and in an embodiment, for each individual detail of the individual product that the crawler was able to gather, a set of [Detail Name, Detail Value] can be added to the individual product list. For example, the possible Detail Names can be defined in the database, whereby, for each Detail Name, it is possible to define whether its values are continuous or discrete, in which case the possible values and/or their ranges can be defined in the database. Once all details for an individual product are collected, the list can be closed, and added to the collection of lists, and a new list is opened for the next individual product.

The systems described herein for providing a network-implemented method for automated dynamic pricing of a product for a seller, can further comprise an analyzer module. The analyzer module can be configured to update formulas and/or product specific variables and their specific weighting coefficients for the "blue book" (i.e., the dynamic pricing list). The analyzer module can be configured to run continuously, querying the database for products, prompting the crawler to retrieve information from the global communication network, and then can internally process that information to create a blue book formula specific for that product. The analyzer module can then insert the formula back into the self-updating database with all updated coefficients. The analyzer module can be operably coupled and be in communication with the self-updating database and the crawler.

The process of calculating the formula and coefficients can be done using, for example, the Ordinary Least Squares (OLS) method of linear regression. The terms "determine", "calculate", and "compute," and variations thereof, as and if used herein, are used interchangeably and can include any type of methodology, process, mathematical operation, or technique. Since the price dependence of the product on variables can be not only linear, but also non-linear, each continuous variable can be calculated through a set of predetermined functions definable through the database. For example, rather than only using the variable of Usage (months), labeled as 't', $t^2$, $t^3$, $e^{-t}$, $\sin(\omega t)$, $\cos(\omega t)$, $\log(\omega t)$, etc. and the like data (e.g., laplace and fourier) transformation as variables in any regression.

The process of fitting a formula after retrieving all data from the Crawler can be done, for example, as follows; a table of each individual product can be created, with the Detail price being defined as the dependent variable 'y', and all other details being defined as observed variables '$x_i$'. For example, for each discrete detail a set of binary values are introduced for all of its possible values. For example, a Detail named 'Condition' with discrete values 'New', 'Good', 'OK' and 'Bad' can be entered to the linear regression as follows:

$$y = \ldots + c_{new}x_{new} + c_{good}x_{good} + c_{ok}x_{ok} + c_{bad}x_{bad} + \ldots$$

where a product with the 'Condition' value 'Good' will have:

$$x_{good}=1 \text{ and } x_{new}=x_{ok}=x_{bad}=0.$$

Likewise, for each continuous Detail (e.g., variable) a set of offspring functions are introduced as observables (e.g., $x_i$). These offspring functions are defined in the database and can be added/removed/modified at any time for future analysis. For example, for a Detail named 'Usage (months)' (written as 'x' for convenience) all of its variables that can be entered to the regression can be introduced as follows:

$$x_1=x, x_2=x^2, x_3=x^3, x_4=\log(x), x_5=e^{-x}, x_6=\sin(x), \text{etc}$$

and be placed in the regression as follows:

$$y= \ldots +c_1 x_1 + c_2 x_2 + c_3 x_3 + c_4 x_4 + c_5 x_5 + c_6 x_6 + \ldots$$

Once the table constructed as described in the embodiment herein is completed, the empty cells can be addressed. The options can be for example; throwing away rows that have missing variables, or to use covariance between each set of variables to fill in the blanks. When the entire table is completed, each variable can be normalized (e.g., $x_i \rightarrow (x_i - \mu_i)/\sigma_i$), following which, regression (e.g., OLS) can be performed and the coefficients are then analyzed to determine which are relevant, and which are irrelevant for the specific product. The criteria for this decision can be based on a percentage of the maximum coefficient coupled with an absolute cutoff. Next, identified irrelevant variables can be removed and another linear regression can be performed. These steps are repeated until all chosen variables are determined relevant. Finally, regression (e.g., linear OLS) can be performed using the non-normalized table to dynamically determine the price function of the product. This function and a list of relevant variables and their weighting coefficients can then be saved in the database.

The systems described herein for providing a network-implemented method for automated dynamic pricing of a product for a seller, can further comprise a calculator module, whose function can be, for example, to receive a product name/ID from a seller with all relevant variables and calculate the official price of that product. In an embodiment, the calculator module is the only module capable of communicating with third parties, for example sellers. Upon receiving a request for a product with specific variables, the calculator module can reference the database to obtain the product's most up-to-date formula and coefficients, enters all the necessary information, determines what data is missing from the user and how to process the information, and returns the result. If any missing is imperative to retrieving the proper dynamic pricing, the calculator can be configured to initiate interstitial communication with the user (e.g., the seller), to obtain the necessary information.

For example, once the request for a product/country is received, the calculator module can query the database's ProductFunction table to receive the relevant function and a list of the variables that must be filled out to calculate the price. The list of variables are obtained and processed to determine what to ask of the External User. For example, a number is requested for each continuous variable, while for each discrete variable, the database can be queried again for all possible values/terms. The user can then be provided with a drop-down menu for example, with these values to choose. Once completed, the user can be asked to input values for each of these variables. Once the user supplies these values, the values of the variables are entered into the function and the proper pricing is provided.

The terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the table(s) includes one or more tables). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In an embodiment, provided herein is a non-transitory, computer-readable medium having instructions stored thereon for network-implemented automated dynamic pricing of a product for a seller, implementable on a networked system comprising: a self-updating database, a database manager module, a crawler module, an analyzer module, a calculator; and an end user interface, wherein the instructions, when executed, cause a computing apparatus to: periodically initiate a query by the analyzer to the crawler; instruct the crawler to retrieve the price of the product from a plurality of pre-determined web sites provided by the analyzer over a global communication network; instruct the analyzer to determine the price of the product; store the price determined in the database; and upon receiving an inquiry from the end-user, to price the product using the calculator.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

Also, the term "non-transitory computer-readable medium" may include a single medium or multiple media (e.g., a centralized or distributed database, or associated caches and servers) that store the one or more instructions. The term "non-transitory computer-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "non-transitory computer-readable medium" shall accordingly be taken to include, but not be limited to, solid-state memories, and optical and magnetic media. Specific examples of non-transitory machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks. The term "disk" as used herein refers to a storage disk or other memory that can store data for a computer system.

The software, information and/or data may further be transmitted or received over a global communications network using a transmission medium via a network interface device utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., LTE, WiFi and WiMax networks). The term "transmission medium" shall be taken to include any intangible medium that is capable of storing, encoding, or carrying instructions for execution by the machine (e.g., a computer), and includes digital or analog communications signals or other intangible medium to facilitate communication of such software. In an embodiment, the methods described herein make use of the systems and non-transitory, computer-readable medium provided herein.

For example, a machine in the exemplary form of a computer system within which the instructions, for causing the machine to perform any one or more of the methods provided herein, may be executed. The machine can for example operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methods disclosed herein.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

Accordingly and in an embodiment, provided herein is a system for providing automated dynamic pricing of a product to a seller, comprising: a self-updating database, a database manager module, a crawler module, an analyzer module, a calculator; and an end user interface, all communicating in a global communication network.

A more complete understanding of the methods and systems disclosed herein can be obtained by reference to the accompanying drawings. These figures (also referred to herein as "FIG.") are merely schematic illustrations based on convenience and the ease of demonstrating the present disclosure, and are, therefore, not intended to limit the scope of the exemplary embodiments.

Figure 1:
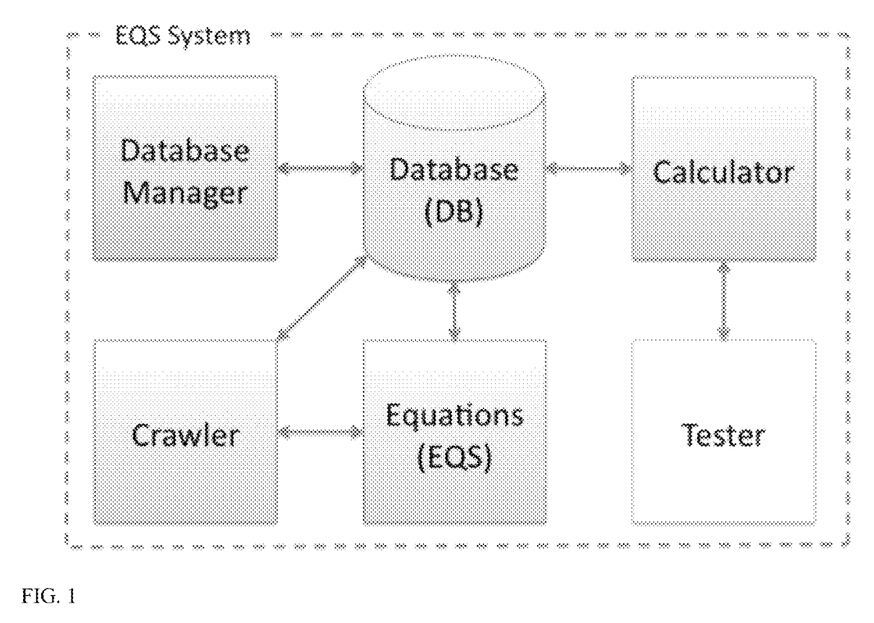
FIG. 1, shows a schematic illustrating high level components of an embodiment of the system.

FIG. 1, illustrates an embodiment of the elements and modules used for providing dynamic product pricing to a seller, using a self-updating database. As illustrated, the system can comprise a database management module, the module being in two-way communication with a database module. The database module is likewise in two-way communication with a calculator module, a crawler module and an analyzer (e.g., equations) module. As illustrated, the calculator can be in two-way communication with a tester module, used to periodically perform QA/QC on the system.

Figure 2:
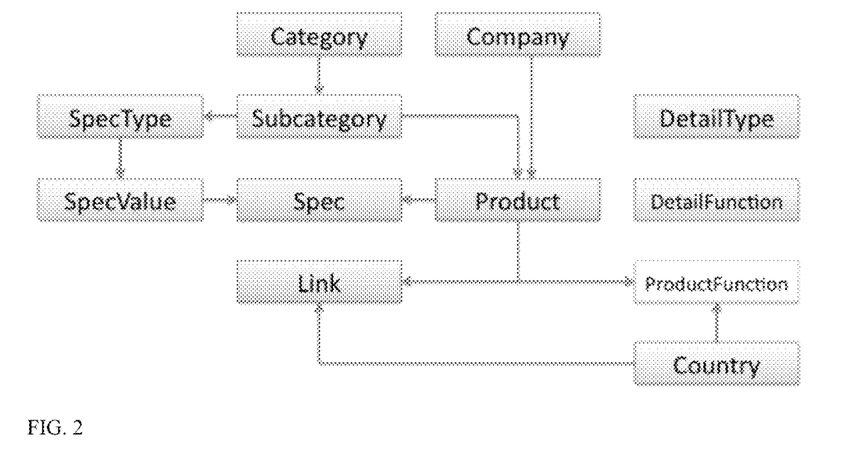
FIG. 2, shows a schematic illustrating an embodiment of the database relations.

Turning now to FIG. 2, illustrating an embodiment of the product specific database module internal relations. As illustrated, each product table can have tables detailing the manufacturing company, the proper category subcategory and accompanying specifications. Likewise, each product can have a list of relevant links to web sites where pricing information can be obtained, retrieved and used by the crawler and analyzer modules to calculate and update the dynamic pricing formula.

Figure 3:
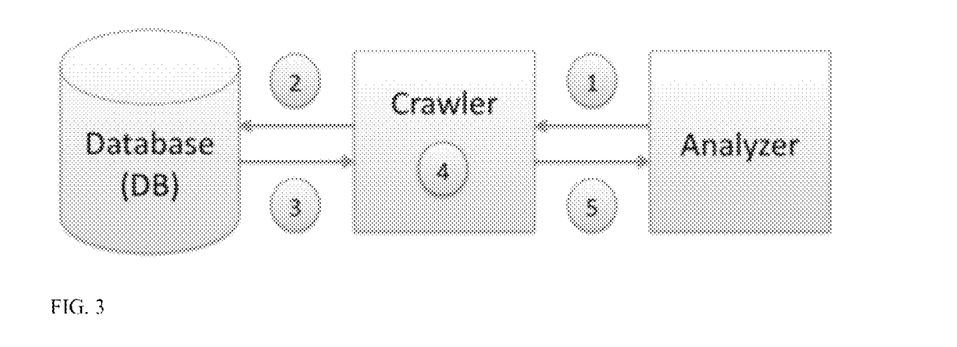
FIG. 3, shows a schematic illustrating an embodiment of the crawler's workflow.
Figure 4:
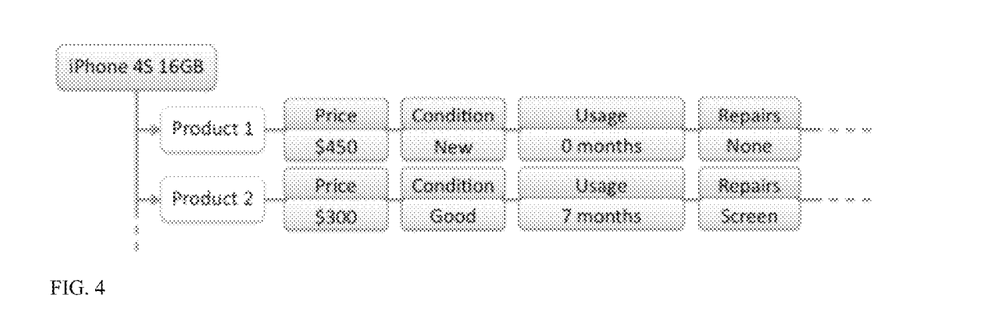
FIG. 4, shows a schematic illustrating an embodiment of the crawler module's retrieved data structure.

Turning now to FIGS. 3 and 4, illustrating in FIG. 3 an embodiment of the crawler module's workflow. As shown (1), the crawler receives a request from the Analyzer module for a specific product pricing. Upon receiving the request, the crawler module queries (2) and receives (3) link(s) stored in the database module; whereupon, the crawler gathers (4) information from all links and processes the gathered information into predetermined structures. If any link is invalid, the crawler will note the link in the database. Once retrieved, the information is sent (5) to the analyzer module. FIG. 4 illustrates the type of data and structure that can be transmitted to the analyzer, for example, for a smartphone.

Figure 5:
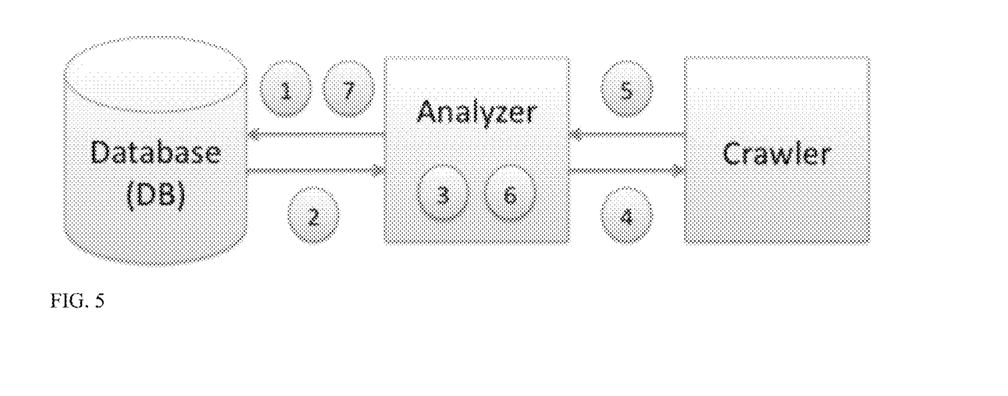
FIG. 5, shows a schematic illustrating an embodiment of the analyzer module's workflow.

Turning now to FIG. 5, illustrating an embodiment, of the analyzer module's workflow. As illustrated, the analyzer module automatically queries (1) and receives from (2) the database module the most out-of-date products. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input can be deemed material if such input influences how the process or operation will be performed. Human input that consents to the performance of the process or operation is not deemed to be "material". Upon receipt of the list, the analyzer module determines (3) which product is next for updating of the formula, whereupon a query is sent (4) to the crawler module. Upon receipt of the pertinent information (5) from the crawler, the analyzer module processes the information (6) to produce an updated pricing formula with the proper variables and coefficients. The formula is then transmitted (7) to the database, updating the stored formula. Upon completion of the updating, the analyzer will again request the most out-of-date products. In determining the priority for updating, the analyzer can be configured to update the formulas according to demand as well.

Figure 6:
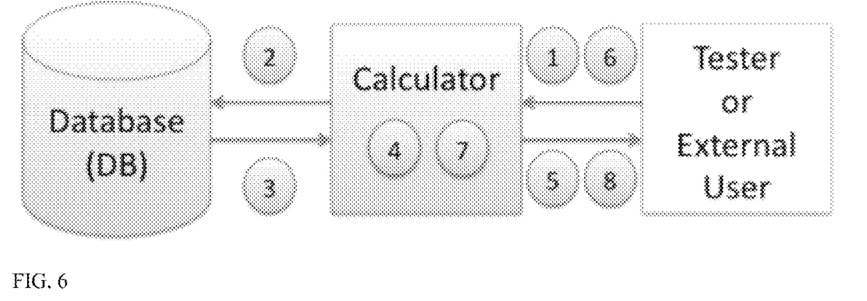
FIG. 6, shows a schematic illustrating an embodiment of the calculator module's workflow.

Turning now to FIG. 6, illustrating an embodiment of the calculator module workflow. As illustrated, the calculator can be prompted (1) by either the optional tester module, or an external user (e.g., the seller), whereupon, the calculator will request (2) and receive (3), based on the request details, the proper and most up-to-date product pricing formula. The calculator module can determine (4) the variables necessary from the requesting entity (e.g., the external user) and request (5) and receive (6) these variables and use these to calculate (7) the price and transmit (8) the dynamic pricing to the requesting entity (e.g., the tester module).

Figure 7:
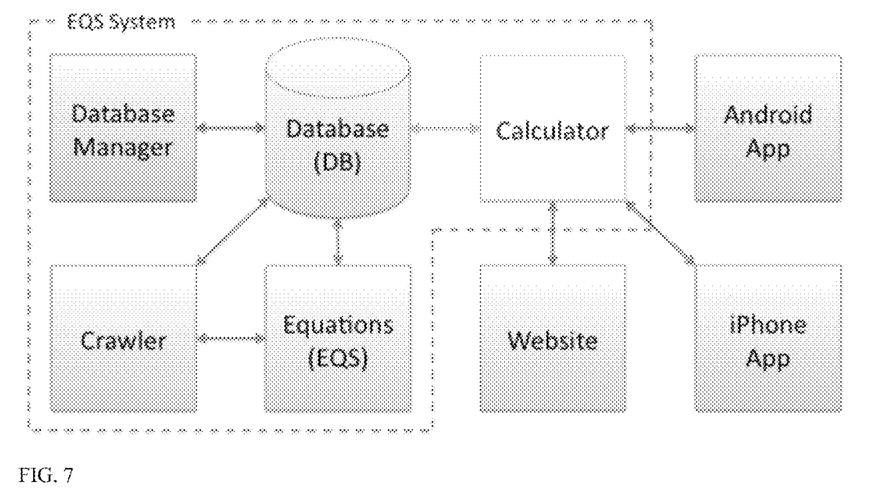
FIG. 7 shows a schematic illustrating an embodiment of the network-implemented system's interaction with various end users.

Turning now to FIG. 7, illustrating an embodiment of possible delivery vehicles to end users. As illustrated, the calculator module alone is in communication with the third party users, which can be for example, any smartphone platform (e.g., iPhone, android, windows, blackberry and the like), or website portals.

In an embodiment, provided herein is a network-implemented method for automated dynamic pricing of a product for a seller, implementable in a system comprising: a self-updating database, a database manager module, a crawler module, an analyzer module, a calculator; and an end user interface, the method comprising the steps of: periodically initiating a query by the analyzer to the crawler; using the crawler, retrieving the price of the product from a plurality of pre-determined web sites provided by the analyzer over a global communication network; using the analyzer module, determining the price of the product; storing a plurality of predetermined coefficients for predicting the price obtained in a memory of the self-updating database, the self-updating database being in communication with the analyzer and the calculator; and upon receiving an inquiry from the seller, pricing the product using the calculator, further (i) comprising a step whereby an initial formula having a plurality of factors and coefficients associated with the factors is established to price the product, wherein (ii) the self-updating database further comprises product name, product specifications, links to the plurality of web sites, product specific price calculation formula, price calculating factors, weighting coefficients for the price calculating factors, or a combination comprising the foregoing, wherein (iii) upon retrieving a price by the crawler, modifying the coefficients associated with the price calculating factors, (iv) the factors are transformed factors, (v) the transformed factors (f) are; f'', sin(f), cos(f), $e^{\pm(f)}$, log(f), ln(f) or a combination comprising at least one of the foregoing, (vi) wherein determining the price of the product comprises transforming the factors by minimizing least sum square between retrieved price and calculated price, further (vii) comprising updating the formula stored on the database, wherein (viii) wherein the crawler further determine the validity of the link and if the link is invalid, updating the database and obtaining a second link, (ix) the data retrieved is communicated to the analyzer in a predetermined structure, wherein (x) the database manager module is configured to provide a graphic interface (GUI), the graphic interface is configured to input initial product pricing formula, product link, a product data table, modifying permission or a combination comprising one of the foregoing, wherein (xi) the calculator is in communication with the self-updating database, whereupon (xii) receiving an inquiry from the end-user, accessing the most updated pricing formula for the product and calculating the price, and wherein (xiii) the system further comprises a testing module.

In another embodiment, provided herein is a non-transitory, computer (and/or machine)-readable medium having instructions stored thereon for network-implemented automated dynamic pricing of a product for a seller, implementable on a networked system comprising: a self-updating database, a database manager module, a crawler module, an analyzer module, a calculator; and an end user interface, wherein the instructions, when executed, cause a computing apparatus to: periodically initiate a query by the analyzer to the crawler; instruct the crawler to retrieve the price of the product from a plurality of pre-determined web sites provided by the analyzer over a global communication network; instruct the analyzer to determine the price of the product; store the price determined in the database; and upon receiving an inquiry from the end-user, to price the product using the calculator, wherein (xiv) the analyzer comprises a set of instructions executed to modify coefficients associated with the price calculating factors, upon retrieving a price by the crawler, wherein (xv) the crawler further comprises a set of instruction configured to validate a link provided by the analyzer, and wherein (xvi) determining the price of the product comprises transforming formula factors by minimizing least sum square between retrieved price and calculated price.

In yet another embodiment, provided herein is a system for providing automated dynamic pricing of a product, comprising: a self-updating database, a database manager module, a crawler module, an analyzer module, a calculator; and an end user (e.g., seller) interface, further (xvii) comprising a testing module.

While in the foregoing specification the network-implemented methods and systems for providing dynamic product pricing to a seller, using a self-updating database have been described in relation to certain embodiments, and many details are set forth for purpose of illustration, it will be apparent to those skilled in the art that the disclosure of the network-implemented methods and systems for providing dynamic product pricing to a seller, using a self-updating database are susceptible to additional embodiments and that certain of the details described in this specification and as are more fully delineated in the following claims can be varied considerably without departing from the basic principles of this invention.

I claim:

1. A network-implemented method for automated dynamic pricing of a product for a seller, implementable in a system comprising: a self-updating database, a database manager module, a crawler module, an analyzer module, a calculator; and an end user interface, the method comprising:
   a. periodically initiating a query by the analyzer to the crawler;
   b. using the crawler, retrieving the price of the product from a plurality of pre-determined web sites provided by the analyzer over a global communication network;
   c. using the analyzer module, determining a plurality of predetermined factors configured to predict the price of the product;
   d. storing a plurality of the predetermined factors' coefficients on a non-transient, computer readable medium for predicting the price obtained in a memory of the self-updating database, the self-updating database being in communication with the analyzer and the calculator;
   e. upon receiving an inquiry from the seller, pricing the product using the calculator using the stored predetermined factors' coefficients;
   f. using an initial formula having a plurality of factors and coefficients associated with the factors, establishing product price,
wherein upon retrieving a price by the crawler, modifying the coefficients associated with the price calculating factors, the price calculating factors being transformed factors that are f'', sin(f), cos(f), $e^{+-}(f)$, log(f), ln(f) or a combination comprising at least one of the foregoing.

2. The method of claim 1, further comprising a step whereby an initial formula having a plurality of factors and coefficients associated with the factors is established to price the product.

3. The method of claim 2, wherein the self-updating database further comprises product name, product specifications, links to the plurality of web sites, product specific price calculation formula, price calculating factors, weighting coefficients for the price calculating factors, or a combination comprising the foregoing.

4. The method of claim 3, wherein, upon retrieving a price by the crawler, modifying the coefficients associated with the price calculating factors.

5. The method of claim 4, wherein the factors are transformed factors.

6. The method of claim 5, wherein determining the price of the product comprises transforming the factors by minimizing least sum square between retrieved price and calculated price based on the stored coefficients.

7. The method of claim 6, further comprising updating the formula stored on the database.

8. The method of claim 7, wherein the crawler further determines the validity of the link and if the link is invalid, updating the database and obtaining a second link.

9. The method of claim 8, wherein the data retrieved is communicated to the analyzer in a predetermined structure.

10. The method of claim 9, wherein the database manager module is configured to provide a graphic interface.

11. The method of claim 10, wherein the graphic interface is configured to input initial product pricing formula, product link, a product data table, modifying permission or a combination comprising one of the foregoing.

12. The method of claim 11, wherein the calculator is in communication with the self-updating database.

13. The method of claim 12, wherein, upon receiving an inquiry from the end-user, accessing the most updated pricing formula for the product and calculating the price.

14. The method of claim 13, wherein the system further comprises a testing module.

15. A non-transitory, computer-readable medium having instructions stored thereon for automated dynamic pricing of a product for a seller, implementable on a system comprising: a self-updating database, a database manager module, a crawler module, an analyzer module, a calculator, and an end user interface, wherein the instructions, when executed, cause a network enabled computing apparatus to:
   a. periodically initiate a query by the analyzer to the crawler;
   b. instruct the crawler to retrieve the price of the product from a plurality of pre-determined web sites provided by the analyzer over a global communication network, wherein the crawler further comprises a set of instruction configured to validate a link provided by the analyzer;
   c. instruct the analyzer to determine predetermined factors' coefficients configured to predict the obtained price of the product;
   d. store a plurality of predetermined coefficients on a non-transient computer-readable medium for determining the price determined by the analyzer; and
   e. upon receiving an inquiry from the end-user, using the stored coefficients price the product with the calculator.

16. The computer-readable medium of claim 15, wherein, the analyzer comprises a set of instructions executed to modify coefficients associated with the price calculating factors, upon retrieving a price by the crawler.

17. The computer-readable medium of claim 15, wherein determining the price of the product comprises transforming formula coefficients by minimizing least sum square between retrieved price and calculated price based on the stored coefficients.

* * * * *